United States Patent
Vincent et al.

(10) Patent No.: US 9,698,432 B2
(45) Date of Patent: Jul. 4, 2017

(54) FUEL CELL INCLUDING BIPOLAR PLATES HAVING WELDS NOT SUPERIMPOSED WITH WELDS OF ADJACENT BIPOLAR PLATES

(75) Inventors: Remi Vincent, Grenoble (FR); Jean-Philippe Poirot-Crouvezier, Saint Georges de Commiers (FR); Pascal Schott, Villard de Lans (FR)

(73) Assignee: Commissariat a l'énergie atomique et aux energies alternatives, Paris (FR)

( * ) Notice: Subject to any disclaimer, the term of this patent is extended or adjusted under 35 U.S.C. 154(b) by 296 days.

(21) Appl. No.: 14/122,390

(22) PCT Filed: May 25, 2012

(86) PCT No.: PCT/EP2012/059864
§ 371 (c)(1),
(2), (4) Date: Jan. 7, 2014

(87) PCT Pub. No.: WO2012/163842
PCT Pub. Date: Dec. 6, 2012

(65) Prior Publication Data
US 2014/0199608 A1    Jul. 17, 2014

(30) Foreign Application Priority Data
May 30, 2011 (FR) ..................... 11 54714

(51) Int. Cl.
*H01M 8/02*    (2016.01)
*H01M 8/10*    (2016.01)
(Continued)

(52) U.S. Cl.
CPC ......... *H01M 8/0247* (2013.01); *H01M 8/021* (2013.01); *H01M 8/0254* (2013.01);
(Continued)

(58) Field of Classification Search
CPC .. H01M 8/021; H01M 8/0254; H01M 8/0267; H01M 8/0247; H01M 8/1002; H01M 8/241; H01M 8/0297
(Continued)

(56) References Cited

U.S. PATENT DOCUMENTS 5,686,199 A    11/1997    Cavalca et al.
5,879,826 A    3/1999    Lehman et al.
(Continued)

FOREIGN PATENT DOCUMENTS

EP    1808920    7/2007

*Primary Examiner* — Sean P Cullen
(74) *Attorney, Agent, or Firm* — Occhiuti & Rohlicek LLP

(57) ABSTRACT

A fuel cell includes three membrane-electrode assemblies. and first and second bipolar metal plates interposed between the membrane-electrode assemblies. Each of the bipolar plates comprises two metal sheets facing a respective membrane-electrode assembly and fixedly attached by welds. The two metal sheets comprise successive guiding channels for guiding gas extending in a common longitudinal direction. The guiding channels are distributed in a transversal direction The welds are made in bottoms of the guiding channel and include welds of the first bipolar plate and welds of the second bipolar plate. Some of the welds of the first bipolar plate are not superimposed on the welds of the second bipolar plate and are offset longitudinally and transversally relative to the welds of the second bipolar plate.

15 Claims, 3 Drawing Sheets

(51) Int. Cl.
  *H01M 8/24* (2016.01)
  *H01M 8/0247* (2016.01)
  *H01M 8/021* (2016.01)
  *H01M 8/0254* (2016.01)
  *H01M 8/0267* (2016.01)
  *H01M 8/0297* (2016.01)
  *H01M 8/241* (2016.01)
  *H01M 8/1007* (2016.01)

(52) U.S. Cl.
  CPC ....... *H01M 8/0267* (2013.01); *H01M 8/0297* (2013.01); *H01M 8/1007* (2016.02); *H01M 8/241* (2013.01)

(58) Field of Classification Search
  USPC ........ 429/457, 452, 467, 470, 507, 522, 535
  See application file for complete search history.

(56) References Cited

U.S. PATENT DOCUMENTS

| | | | |
|---|---|---|---|
| 7,294,425 B2 | 11/2007 | Hodge et al. | |
| 7,465,513 B2 | 12/2008 | Blank et al. | |
| 7,494,732 B2 | 2/2009 | Roy et al. | |
| 7,754,364 B2 | 7/2010 | Darling et al. | |
| 8,021,525 B2 | 9/2011 | Giddey et al. | |
| 2004/0023095 A1 | 2/2004 | Middelman et al. | |
| 2004/0053108 A1 | 3/2004 | Tsunoda | |
| 2005/0221131 A1 | 10/2005 | Roy et al. | |
| 2006/0046130 A1 | 3/2006 | Lai | |
| 2006/0054664 A1* | 3/2006 | Strobel | H01M 8/0206 228/179.1 |
| 2007/0003821 A1* | 1/2007 | Belchuk | H01M 8/0273 429/465 |
| 2007/0082252 A1* | 4/2007 | Goebel | H01M 8/0258 429/434 |
| 2008/0206617 A1 | 8/2008 | Okada et al. | |
| 2008/0292916 A1 | 11/2008 | Newman et al. | |
| 2009/0092872 A1 | 4/2009 | Miyazawa | |
| 2009/0181275 A1* | 7/2009 | Beutel | H01M 4/8828 429/431 |
| 2010/0167105 A1 | 7/2010 | Finsterwalder et al. | |
| 2011/0020727 A1* | 1/2011 | Burlatsky | H01M 4/92 429/483 |
| 2013/0115539 A1* | 5/2013 | O'Brien | H01M 8/0258 429/434 |
| 2014/0065509 A1* | 3/2014 | Skala | H01M 8/0284 429/460 |
| 2014/0072899 A1* | 3/2014 | Fly | H01M 8/1004 429/463 |
| 2014/0272661 A1* | 9/2014 | Goebel | H01M 8/0258 429/457 |

* cited by examiner

FUEL CELL INCLUDING BIPOLAR PLATES HAVING WELDS NOT SUPERIMPOSED WITH WELDS OF ADJACENT BIPOLAR PLATES

CROSS REFERENCE TO RELATED APPLICATION

This application is the national phase under 35 USC 371 of international application no. PCT/EP2012/059864, filed May 25, 2012, which claims the benefit of the priority date of French application no. 1154715, filed May 30, 2011. The contents of the aforementioned application is incorporated herein in their entirety.

FIELD OF DISCLOSURE

The invention pertains to fuel cells and especially to proton-exchange membrane fuel cells.

BACKGROUND

Fuel cells are especially envisaged as an energy source for future mass-produced motor vehicles. A fuel cell is an electrochemical device that converts chemical energy directly into electrical energy. A fuel cell comprises a stack of several cells in series. Each cell generates a voltage of the order of 1 Volt and their stacking enables the generation of a power supply voltage of a higher level, for example of the order of 100 volts.

Among the known types of fuel cells, we can cite especially the proton-exchange membrane, or "PEM." Such fuel cells have particularly interesting properties of compactness. Each cell has an electrolytic membrane enabling only the passage of protons and not the passage of electrons. The membrane enables the separation of the cell into two compartments to prevent direct reaction between the reactant gases. The membrane comprises an anode on a first face and a cathode on a second face, this assembly being usually designated by the term "membrane/electrode assembly" or "MEA."

Within the fuel cell's active area, at the anode, molecular hydrogen or hydrogen (H2) used as fuel is ionized to produce protons passing through the membrane. The electrons produced by this reaction migrate to a flow plate and then pass through an electrical circuit external to the cell to form an electrical current. At the cathode, oxygen is reduced and reacts with the protons to form water.

The cell can comprise several flow plates, for example made of metal, stacked on one another. The membrane is positioned between two flow plates. The flow plates can comprise channels and holes to guide the reactants and products to and from the membrane. The plates are also electrically conductive so as to form collectors for the electrons generated at the anode. Gas diffusion layers are interposed between the electrodes and the flow plates and are in contact with the flow plates.

The flow plates are in contact with highly acidic solutions. On the cathode side, the plate is subjected to air under pressure in a highly oxidizing environment. On the anode side, the plate is contact with hydrogen. In such conditions, the metal plates undergo corrosion phenomena. The corrosion of a plate causes, firstly, the emission of metal ions that impair the working of the electrolytic membrane. The corrosion of the plate, secondly, gives rise to the formation of an insulating oxide layer on the metal, thus increasing its contact resistance relative to the gas diffusion layer. The electrical resistance between the flow plate and the gas diffusion layer is then increased. These phenomena cause a reduction of performance of the fuel cell. The flow plates must therefore have a high electrical conductivity while at the same time avoiding phenomena of oxidation and corrosion.

The industrial-scale development of fuel cells implies a great increase in the costs of manufacture of the different components. In particular, the cost of the flow plates is as yet unacceptable for large-scale use.

To reduce their cost, the flow plates are generally formed as bipolar plates including two flow plates. In one industrially tested solution, two metal sheets made of stainless steel are pressed and joined back-to-back by laser welding to form flow plates for adjacent cells. The welds are made at the bottom of channels, and the bottoms of the channels of the two back-to-back metal sheets are placed in contact. In order to reduce manufacturing costs, the back-to-back metal sheets have the same geometry.

The document US2006046130 describes a fuel cell intended to limit the influence of the variation of compressive forces on a stack of cells. The bipolar plates are formed by assembling two metal sheets. Each metal sheet has a relief to form gas flow channels. A multitude of adjacent channels extends along a same direction. Two metal sheets are joined together in placing the bottom of certain channels of these sheets in contact and then making welds in these bottoms. To enable the absorption of the variations in compressive forces, spaces are made between the bottoms of certain channels of two joined metal sheets. To homogenize the absorption of the variations of compression along the direction transversal to the channels, the spaces of the successive bipolar plates are offset.

In practice, prior-art fuel cells have relative heterogeneous functioning at the level of the membrane/electrode assembly. This heterogeneity can be explained especially by the development of the humidity of the gases between the input and the output of the membrane/electrode assembly. This heterogeneity induces a local increase in the current density, fostering localized corrosion of carbon.

SUMMARY

The invention seeks to resolve one or more of the foregoing drawbacks. The invention is aimed especially at obtaining a low-cost fuel cell favoring homogeneity of the current density through the membrane/electrode assemblies. The invention pertains to a fuel cell.

The inventors have shown that the local conductivity of a bipolar plate also has an influence on the heterogeneity of the working of the membrane/electrode assembly. In particular, the inventors have noted that the welds between two back-to-back metal sheets and their positioning had considerable influence on this heterogeneity.

The invention proposes a fuel cell comprising three adjacent membrane/electrode assemblies separated by first and second metal bipolar plates. The bipolar plates comprise two facing metal sheets fixedly attached by welds.

At least part of the welds of the first bipolar plate are not superimposed on the welds of the second bipolar plate, these welds of the first bipolar plate being offset longitudinally and transversally relative to the welds of the second bipolar plate.

The invention forces the currents crossing the bipolar plates and the membrane/electrode assemblies to take sinuous paths. The invention significantly optimizes the homogeneity of the current density through the protein-exchange membrane (and therefore improves resistance to corrosion and extends the service life of the fuel cell), without requiring any increase in the density of welds and therefore without any extra industrial cost. The invention runs counter to the usual approach of those skilled in the art which is to standardize the bipolar plates to the maximum in systematically using welds localized at the same place. In addition, those skilled in the art are not encouraged in the prior art to space out the welds as the serial connection of the cells through the bipolar plates normally induces a search for minimum electrical resistance and therefore a shorter electrical path.

BRIEF DESCRIPTION OF THE FIGURES

Other features and advantages of the invention shall appear more clearly from the following description given by way of an indication that in no way restricts the scope of the invention, with reference to the appended drawings of which.

DETAILED DESCRIPTION

Figure 1:
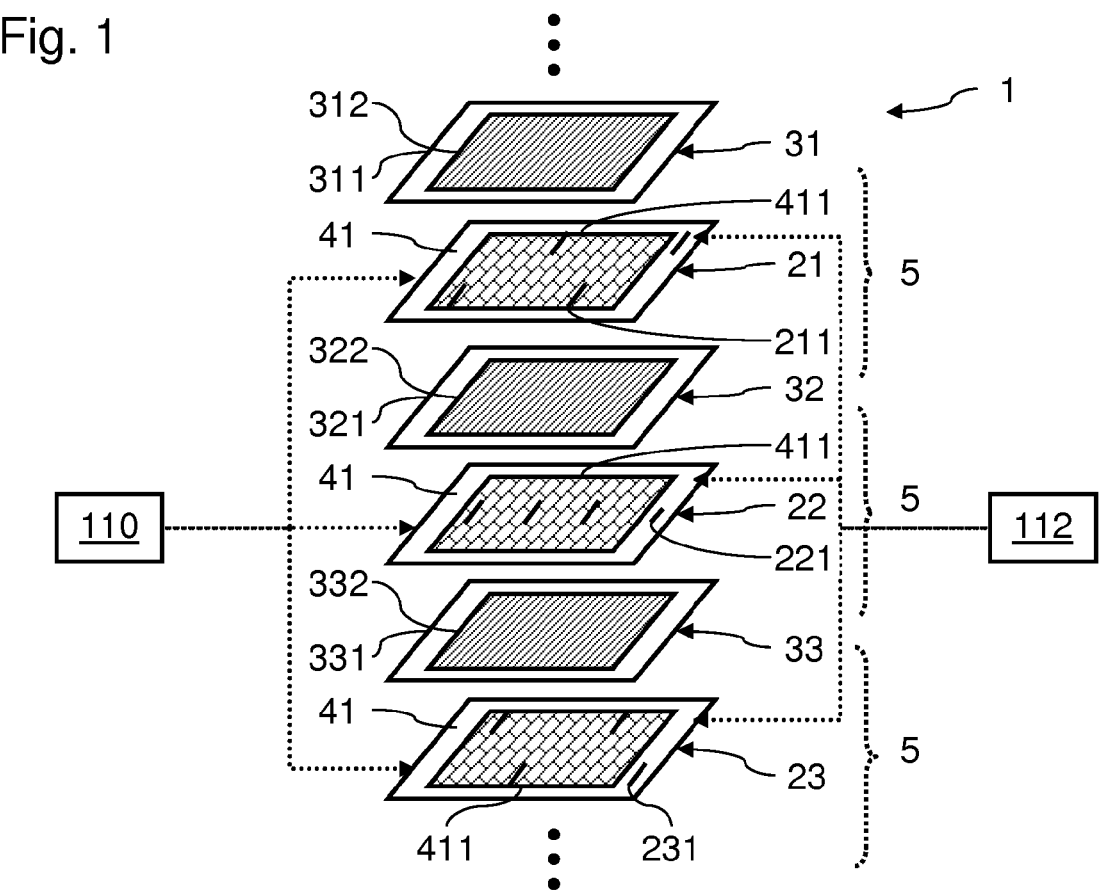
FIG. 1 is an exploded view in perspective of an example of a fuel cell according to one embodiment of the invention.

FIG. 1 is a schematic exploded view in perspective of a part of a fuel cell 1 according to one embodiment of the invention. The fuel cell 1 is of a proton-exchange membrane or polymer electrolyte membrane type. The fuel cell 1 comprises several superimposed cells 5. The fuel cell 1 comprises a fuel source 110 that feeds hydrogen (H2) to an inlet of each cell 5. The fuel cell 1 also has an air source 112 that feeds an inlet of each cell with air, the air containing oxygen used as an oxidant. Each cell 5 also has exhaust channels that are not shown. Each cell 5 can also have a cooling circuit not shown.

Each cell 5 comprises a membrane/electrode assembly. The illustrated fuel cell 1 comprises especially membrane/electrode assemblies or MEAs 31, 32 and 33. Each membrane/electrode assembly comprises a layer of electrolyte formed for example by a polymer membrane (respectively 311, 321 and 331 for the assemblies 31, 32 and 33).

A membrane/electrode assembly also comprises a cathode (not shown in FIG. 1) and an anode (respectively 312, 322 and 332 for the assemblies 31, 32 and 33) placed on either side of the electrode and fixed to this electrolyte.

The electrolyte layer forms a semi-permeable membrane enabling proton conduction while at the same time being impermeable to the gases present in the cell 5. The electrolyte layer also prevents passage of electrons between the anode and the cathode.

Each cell 5 has a flow guide plates disposed so as to be respectively facing the anode and the cathode. Each cell 5 furthermore has a gas diffusion layer (not shown) disposed between the anode and the guide plate. Each cell 5 furthermore has a gas diffusion layer (not shown) disposed between the cathode and the guide plate.

Between each pair of adjacent MEAs, there is a pair of flow guides. The flow guides of each pair are fixedly attached to form a bipolar plate. Thus, the fuel cell 1 has a bipolar plate 21 (disposed between the MEAs 31 and 32), a bipolar plate 22 (disposed between the MEAs 32 and 33), and a bipolar plate 23. Each flow guide is formed by a metal sheet. The bipolar plate 21 thus comprises a metal sheet 41 oriented towards the cathode of the MEA 31 and a metal sheet 42 oriented towards the anode of the MEA 32. The metal sheet 41 comprises a surface in relief 411 defining flow channels 412. The metal sheet 42 comprises a surface in relief defining flow channels 422. The metal sheets 41 and 42 are fixedly attached by the welds 211, 221 and 231 respectively for the bipolar plates 21, 22 and 23. For reasons of readability, only a reduced number of welds is illustrated, these welds being illustrated very schematically.

During the operation of the fuel cell 1, air flows between the MEAs and the metal sheets 41, and hydrogen (H2) flows between the MEAs and the metal sheets 42. At the anodes, hydrogen (H2) is ionized to produce protons that pass through the MEAs. The electrons produced by this reaction are collected by a metal sheet 41. The electrons produced are then applied to an electrical load connected to the fuel cell 1 to form an electrical current. At the cathodes, oxygen is reduced and reacts with the protons to form water. The reactions at the anode and the cathode are set as follows:

$H_2 \rightarrow 2H^+ + 2e^-$ at the anode;

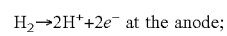

$4H^+ + 4e^- + O_2 \rightarrow 2H_2O$ at the cathode.

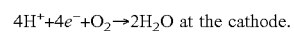

When it is in operation, a cell of the fuel cell 1 usually generates a DC voltage on the order of 1V between the anode and the cathode.

According to the invention, at least a part of the welds of two adjacent bipolar plates are not superimposed. Advantageously, at least 50% of the surface of the welds of two adjacent plates is not superimposed. Thus, the welds 211 of the bipolar plate 21 are not at all superimposed on the welds 221 of the bipolar plate 22. Similarly, the welds 231 of the bipolar plate 23 are not at all superimposed on the welds 221 of the bipolar plate 22. The welds of two adjacent bipolar plates are offset both longitudinally and transversally as described in detail here below. Thus, the proton current through the MEAs is not perpendicular only to the MEA, thus homogenizing the proton current density on the surface of the MEA.

Figure 2:
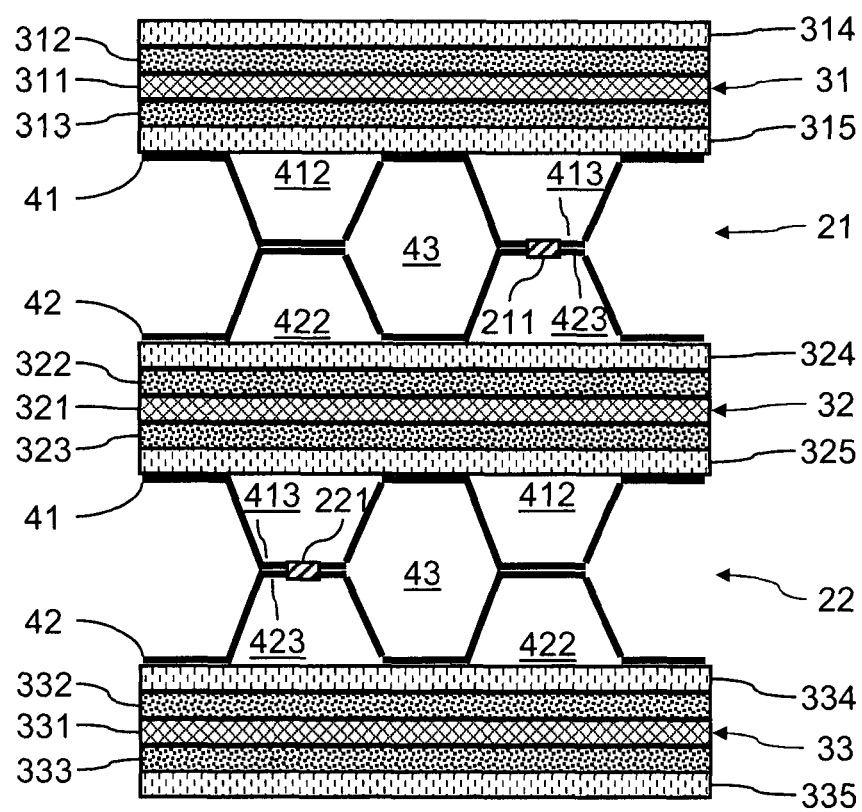
FIG. 2 is a view in section of the fuel cell of FIG. 1.

FIG. 2 is a view in schematic section of a variant of a fuel cell 1. The MEA 31 comprises gas diffusion layers 314 and 315 disposed respectively on the anode 312 and on the cathode 313. The MEA 32 comprises gas diffusion layers 324 and 325 disposed respectively on the anode 322 and on the cathode 323. The MEA 33 has gas diffusion layers 334 and 335 disposed respectively on the anode 332 and on the cathode 333. The gas diffusion layers 314, 324 and 334 serve to diffuse hydrogen (H2) towards their respective anode. The gas diffusion layers 315, 325 and 335 serve to diffuse oxygen (O2) towards their respective cathodes. The gas diffusion layers can for example be made in a manner known per se in the form of fibers, felt or graphite tissue to which a hydrophobic agent such as polytetrafluoroethylene is fixed. The gas diffusion layer 315 is in contact with the metal sheet 41 of the bipolar plate 21. The gas diffusion layer 324 is in contact with the metal sheet 42 of the bipolar plate 21. The gas diffusion layer 325 is in contact with the metal sheet 41 of the bipolar plate 22. The gas diffusion layer 334 is contact with the metal sheet 42 of the bipolar plate 22.

The metal sheets 41 have a relief in which successive flow channels 412 are formed, extending along a longitudinal direction. The flow channels 412 are distributed in a transversal direction. The metal sheets 42 have a relief in which successive flow channels 422 are formed, extending along a longitudinal direction. The flow channels 422 are distributed in a transversal direction. The flow channels 412 and 422 are superimposed. The metal sheets 41 and 42, thus attached, mutually define a flow circuit 43 for cooling liquid. The flow channels 412 are demarcated by bottoms 413. Similarly, the flow channels 422 are demarcated by bottoms 423. The bottoms 413 and 423 are laid out so as to be in contact. For reasons of intelligibility, FIG. 2 is a split section view with parallel planes illustrating welds present at different longitudinal levels. In the bipolar plate 21, the welds 211 are made locally in bottoms 413 and 423 of the flow channels. In the bipolar plate 22, the welds 221 are made locally in the bottoms 413 and 423 of the flow channels. For the sake of simplification, the inlets and outlets made in the metal sheets 41 and 42 to communicate with the flow channels 412 and 422 are not illustrated.

Figure 3:
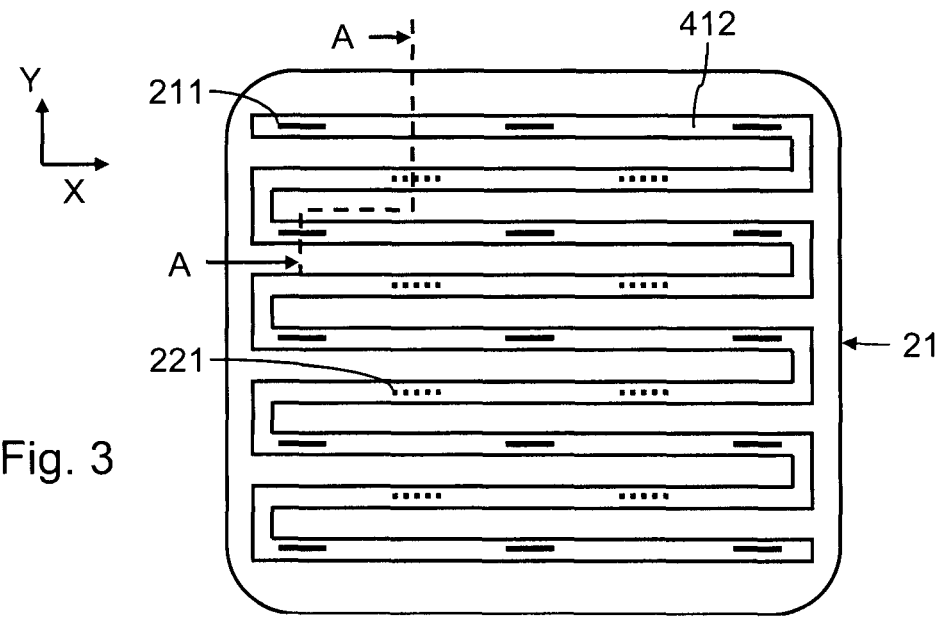
FIG. 3 is a schematic representation of the disposition of the welds for two superimposed bipolar plates.

FIG. 3 illustrates the respective positions of the welds 211 and 221 of the fuel cell 1 of FIG. 2, in projection on a plane along a direction perpendicular to the bipolar plates. The direction X corresponds to the longitudinal direction, namely the direction of extension of the flow channels 412 and 422. The direction Y corresponds to the transversal direction namely the direction of distribution of the flow channels 412 and 422. The welds shown in solid lines correspond to the welds 211 of the bipolar plate 21. The welds shown in broken lines correspond to the welds 221 of the bipolar plate 22, seen transparently. As illustrated in FIG. 3, the welds 211 and 221 of the bipolar plates 21 and 22 are not at all superimposed. The welds 211 and 221 are offset relative to each other longitudinally and transversally. The welds 211 and 221 are distributed on the projection plane. The welds 211 and 221 are offset both longitudinally and transversally in order to make the path of the electrical current as sinuous as possible and therefore to optimize its homogenization. Advantageously, the welds of a bipolar plate are disposed at the barycenter of the closest welds belonging to the adjacent bipolar plate. Thus, in the example, each weld 221 is disposed at the barycenter at the four welds 211.

The flow channel 412 illustrated is schematic. When there is a multitude of bipolar plates, two bipolar plates, between which another bipolar plate is interposed, can have the same disposition of the welds. In the example, the welds 211 and the welds 231 have the same localization.

Such welds 211 are typically made by laser. This is a method widely used, especially in automobile construction.

Advantageously, the projections of the welds of the adjacent bipolar plates on a common plane along a direction perpendicular to these plates are distant from each other by least 5 mm, preferably at least 10 mm, and advantageously at least 50 mm. To optimize the distribution of the welds on the same bipolar plate, the welds of this plate will be advantageously distant from each other by at least 10 mm, preferably at least 20 mm, and advantageously at least 100 mm.

The density of the welds is essentially defined by the mechanical resistance of the bond between the sheets 41 and 42 of a bipolar plate. This density of welds advantageously ranges from 0.1 to 1 weld per cm$^2$. The density of welds can also be defined by a ratio between the welding surface and the section of the bipolar plate. The welds made can be spot welds, straight straight-seam welds, or curved-seam welds with intersections. The welds made on a bipolar plate are advantageously distributed on it to favor the homogenization of the current density. The welds can also be disposed on a bipolar plate according to the distribution of temperature in this plate during operation. The position of the welds could be adapted specifically to a bipolar plate as a function of its design, the shape of its flow channels, and as a function of the number of MEA in the fuel cell 1.

The metal sheets 41 and 42 are advantageously made out of stainless steel, a very commonly used material adapted to numerous widespread methods of industrial transformation. The relief of the metal sheets 41 and 42, especially the flow channels 412 and 422, is, for example, generated by the pressing or stamping of flat metal sheets. The metal sheets of the different bipolar plates can be identical in order to increase the effect of scale in the components intended for the manufacture of the fuel cell 1.

Figure 4:
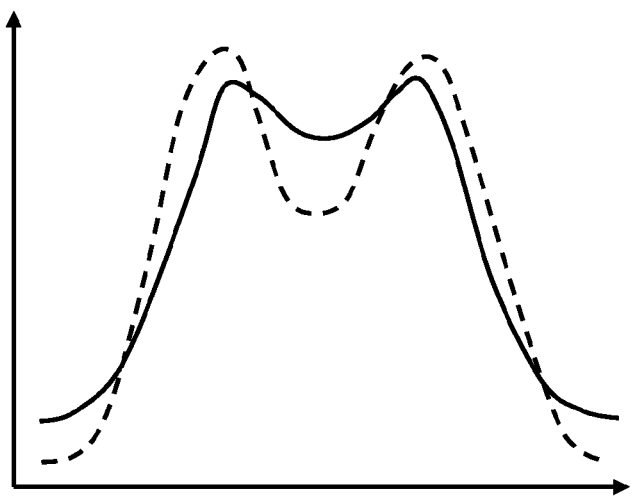
FIG. 4 is a comparative graph of the current density in a membrane with a fuel cell according to the invention and a fuel cell according to the prior art.

FIG. 4 is a comparative graph obtained by simulation. The graph compares the proton current density through the MEA as a function of its position along an axis. The line of dashes corresponds to the current density according to the prior art and the solid line corresponds to the current density with welds disposed according to the invention. A significant improvement is observed in the homogeneity of the current density with welds disposed according to the invention.

Figure 5:
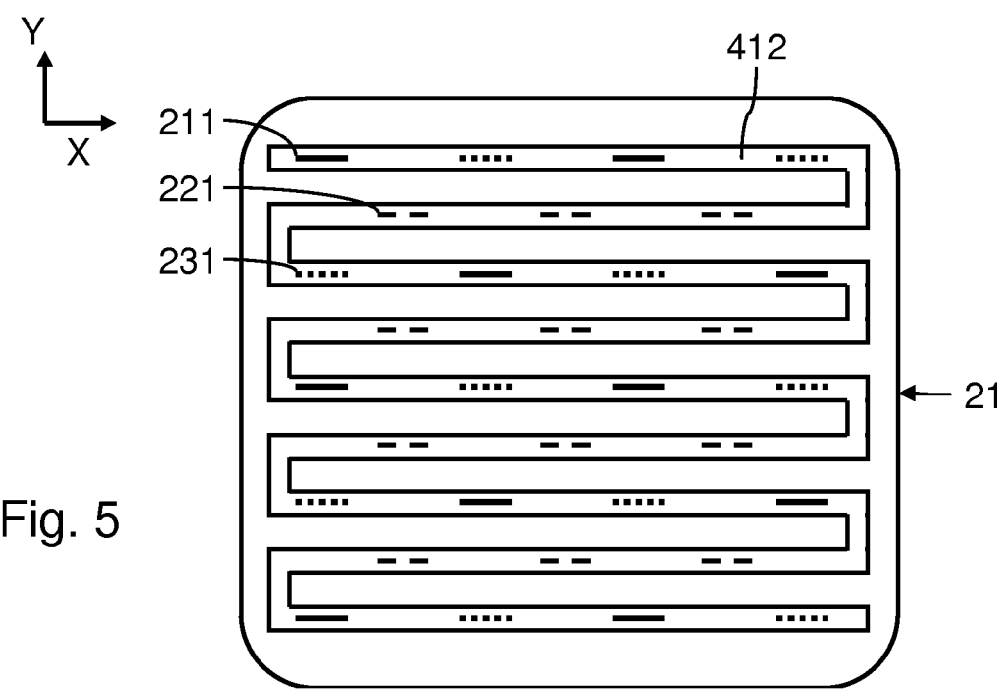
FIG. 5 is a schematic representation of the disposition of the welds for three superimposed bipolar plates.

FIG. 5 is a schematic view in section of the fuel cell 1 of FIG. 1. The flow channels of the different metal sheets of the bipolar plates 21, 22 and 23 are superimposed and extend in a longitudinal direction. Only the flow channel 412 and the bipolar plate 21 are illustrated herein. FIG. 5 illustrates the position in projection on this bipolar plate 21 of the welds of the different metal sheets of the bipolar plates 21, 22 and 23. Welds of the bipolar plate 21 are illustrated by solid lines, welds of the bipolar plate 22 are illustrated by dashes and welds of the bipolar plate 23 are illustrated by dots. As in the variant illustrated here above, the welds of the two adjacent bipolar plates are offset longitudinally and transversally.

In order to make the path of the electrical current as sinuous as possible between the bipolar plates 21, 22 and 23, the welds of these different plates are not superimposed, and the welds of two distinct plates are offset longitudinally and transversally. To make the path particularly sinuous, a weld 221 of the bipolar plate 22 (disposed between the biopolar plates 21 and 23) is placed at the barycenter of the four closest welds belonging either to the bipolar plate 21 or to the bipolar plate 23. Thus, the welds 221 are herein disposed at the barycenter between two welds 211 and two welds 231, the four welds closest to a weld 221 being distributed between the bipolar plates 21 and 23.

Having described the invention, and a preferred embodiment thereof, what is claimed as new, and secured by Letters Patent is:

1. A manufacture comprising a fuel cell, said fuel cell comprising: first, second and third membrane-electrode assemblies, each membrane electrode assembly comprising an anode and a cathode; and a first bipolar metal plate interposed between and in contact with said first and second membrane-electrode assemblies and a second bipolar metal plate interposed between and in contact with said second and third membrane-electrode assemblies, wherein each of said first and second bipolar metal plates comprises two metal sheets fixedly attached to each other by welds; wherein the two metal sheets of each of the first and second bipolar metal plates comprise successive guiding channels for guiding gas, each guiding channel demarcated by a bottom, the guiding channels of each metal sheet extending in a common longitudinal direction and distributed in a transversal direction, wherein the two metal sheets of each of the first and second bipolar metal plates are in contact along the bottoms of their respective guiding channels and joined by said welds, wherein said welds comprise welds of said first bipolar metal plate and welds of said second bipolar metal plate, wherein at least a part of said welds of said first bipolar metal plate are not superimposed on said welds of said second bipolar metal plate and are offset longitudinally and transversally relative to said welds of said second bipolar metal plate; wherein the first bipolar metal plate and the second bipolar metal plate conduct electric current and are in an active area of the fuel cell at which protons are produced, thus making available electrons for forming electric current, and wherein the welds of said first bipolar metal plate and the welds of said second bipolar metal plate are in the active area of the fuel cell.

2. The manufacture of claim 1, wherein said welds of said first bipolar metal plate are not all superimposed on said welds of said second bipolar metal plate.

3. The manufacture of claim 1, wherein said welds comprise projections, and wherein said projections of said welds of said first and second bipolar metal plates are on a common plane in a direction perpendicular to said plates and are separated by at least 5 mm.

4. The manufacture of claim 1, wherein said welds comprise projections, and wherein said projections of said welds of said first and second bipolar metal plates are on a common plane in a direction perpendicular to said plates and are separated by at least 10 mm.

5. The manufacture of claim 1, wherein said welds comprise projections, and wherein said projections of said welds of said first and second bipolar metal plates are on a common plane in a direction perpendicular to said plates and are separated by at least 50 mm.

6. The manufacture of claim 1, wherein said welds of said first bipolar metal plate are each disposed at a barycenter of those welds of said second bipolar metal plate that are closest to said welds of said first bipolar metal plate.

7. The manufacture of claim 1, wherein each said of said first and second bipolar metal plates have a density that ranges from 0.1 to 1 weld per $cm^2$.

8. The manufacture of claim 1, wherein said welds of said bipolar metal plates are distributed homogenously on said bipolar metal plates.

9. The manufacture of claim 1, wherein said welds comprise spot welds.

10. The manufacture of claim 1, wherein said welds comprise straight-seam welds.

11. The manufacture of claim 1, wherein said metal sheets comprise stainless steel.

12. The manufacture of claim 1, wherein said metal sheets demarcate a flow circuit for a cooling liquid.

13. The manufacture of claim 1, further comprising: a third bipolar metal plate having welds, wherein said second bipolar metal plate is disposed between said first and third bipolar metal plates, wherein said third bipolar metal plate comprises two metal sheets fixedly attached by welds, wherein said metal sheets of said third bipolar metal plate comprise successive guiding channels for guiding gas, each guiding channel demarcated by a bottom, the guiding channels of said third bipolar metal plate extending along the common longitudinal direction and distributed in the transversal direction, wherein the two metal sheets of the third bipolar metal plate are in contact along the bottoms of their respective guiding channels and joined by said welds, wherein at least a part of said welds of said third bipolar metal plate are offset longitudinally and transversally relative to said welds of said first and second bipolar metal plates, wherein said welds of said second bipolar metal plate are each disposed at a barycenter of four welds closest to said welds of said second bipolar metal plate, and wherein said four welds closest to said welds of said second bipolar metal plate belong to one of said first bipolar metal plate and said third bipolar metal plate.

14. The manufacture of claim 1, wherein one metal sheet of the first bipolar metal plate is oriented toward the cathode of the first membrane-electrode assembly and the other metal sheet of the first bipolar metal plate is oriented toward the anode of the second membrane-electrode assembly, and wherein one metal sheet of the second bipolar metal plate is oriented toward the cathode of the second membrane-electrode assembly and the other metal sheet of the second bipolar metal plate is oriented toward the anode of the third membrane-electrode assembly.

15. The manufacture of claim 14, wherein the one metal sheet of the first bipolar metal plate oriented toward the cathode of the first membrane-electrode assembly is in contact with one of the cathode of the first membrane-electrode assembly or a gas diffusion layer in contact with the cathode of the first membrane-electrode assembly and the other metal sheet of the first bipolar metal plate oriented toward the anode of the second membrane-electrode assembly is in contact with one of the anode of the second membrane-electrode assembly or a gas diffusion layer in contact with the anode of the second membrane-electrode assembly; and wherein the one metal sheet of the second bipolar metal plate oriented toward the cathode of the second membrane-electrode assembly is in contact with one of the cathode of the second membrane-electrode assembly or a gas diffusion layer in contact with the cathode of the second membrane-electrode assembly and the other metal sheet of the second bipolar metal plate oriented toward the anode of the third membrane-electrode assembly is in contact with the anode of the third membrane-electrode assembly or a gas diffusion layer in contact with the anode of the third membrane-electrode assembly.

* * * * *